UNITED STATES PATENT OFFICE.

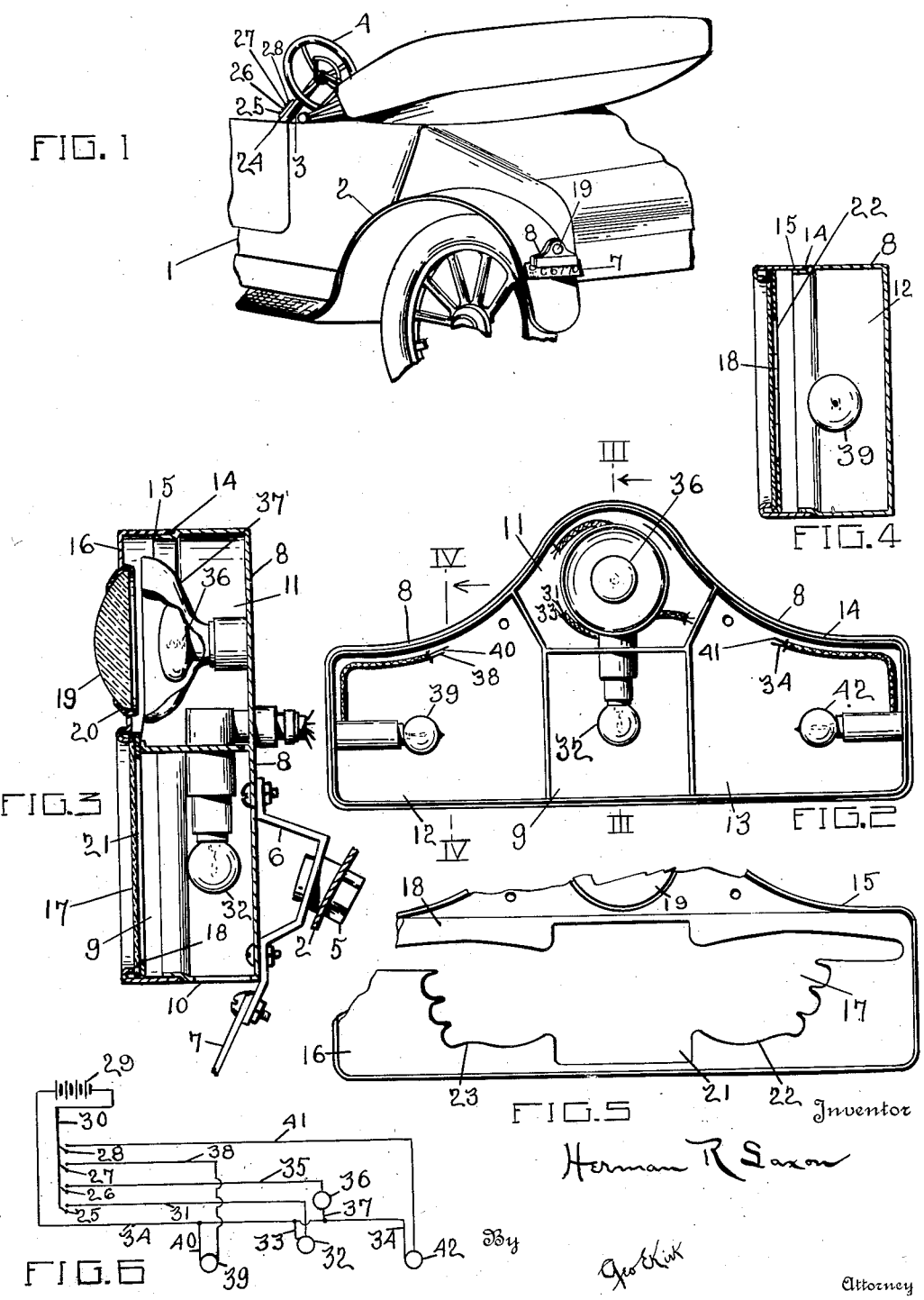

HERMAN R. SAXON, OF TOLEDO, OHIO.

TRAFFIC-SIGNAL.

1,350,469.

Specification of Letters Patent. Patented Aug. 24, 1920.

Application filed November 2, 1916. Serial No. 129,062.

*To all whom it may concern:*

Be it known that I, HERMAN R. SAXON, a citizen of the United States of America, residing at Toledo, Lucas county, Ohio, have invented new and useful Traffic-Signals, of which the following is a specification.

This invention relates to traffic signal and display devices with controlling connections therefor.

This invention has utility when incorporated in illuminated tail lamp carrying traffic signal devices for motor vehicles.

Referring to the drawings:

Figure 1 is a perspective view with parts broken away of an embodiment of the invention in a motor vehicle;

Fig. 2 is a detail view on an enlarged scale of the housing and contents, the front panel being removed;

Fig. 3 is a section on the line III—III, Fig. 2, looking in the direction of the arrow;

Fig. 4, is a section on the line IV—IV, Fig. 2, looking in the direction of the arrow;

Fig. 5 is an elevation with parts broken away of the inside of the front panel; and Fig. 6 is a wiring diagram.

The motor vehicle 1 is provided with a fender 2, and a steering post 3 carrying the steering wheel 4. Mounted on the fender 2 by the bolt 5 is the bracket 6 carrying the license plate 7 and the housing 8. This housing 8 has the central lower compartment 9 with the opening 10 therefrom in the lower part to illuminate the license plate 7 from said compartment 9. Directly above this compartment 9 is the compartment 11 configured to project above the line of the compartment 9 and the adjacent compartments 12 and 13, the compartments 12, 9 and 13, being in a row. Accordingly the housing 8 contains four compartments 9, 11, 12, 13, separated by an H-shaped partition.

The housing 8 has an inwardly offset seat 14 about its forward side which is engaged by the endless flange 15 of the front closing member 16 carrying the plain red glass panel 17 held in position therein by the plate 18 soldered into the panel. The bullseye 19 as fitted in the bezel 20 serves as a window for the compartment 11. The central portion of the plate 18 has the rectangular opening 21 providing a window through the red glass 17 for the tail light. The plate 18 in front of the compartment 12 is configured for a direction signal by the provision of the outwardly pointing hand 22, while the plate 18 in front of the panel 13 is configured also with a direction signal in the form of an outwardly pointing hand 23.

Mounted on the steering post 3 is the block 24 carrying switches 25, 26, 27, 28, which may be pulled or pushed to operate controlling circuits.

The source of electric energy, as the battery 29, is connected by the line 30 as a trunk and through switch 25 may close the circuit by the line 31 to the lamp 32 in the compartment 9 and when so closed complete a circuit through the line 33 and line 34 back to the battery 29. This illumination of the lamp 32 displays the license tag 7 as well as discloses a red tail light through the window 21 in the plate 18 as colored by the panel 17. The hands 22 and 23 back of this red panel 17 are concealed and accordingly not visible.

Closing of the switch 26 through the line 35 to the lamp 36 in the compartment 11 with the circuit completed by line 37 to the line 34 lights this lamp 36 in the parabolic reflector 37' having the condensing lens 19 of clear glass for providing a way illuminating or disclosing lamp especially desirable in backing a vehicle at night or otherwise serving for rearward illumination. This is a matter of convenience in backing in the garage or Y-ing as well as in other backing or rear illumination operations.

The switch 27 through the line 38 may illuminate the element 39 by completing the circuit through the line 40 to line 34. This lamp 39 is in the compartment 12 and discloses when illuminated the hand 22 as an indication that the driver of the vehicle expects to turn the car to his left. Throwing of the switch 28 disclosing the circuit through the line 41 to the lamp 42 and by the line 34 back to the battery 29 or source of electric energy illuminates the lamp 42 in the compartment 13 for disclosing the configuration of the hand 23 as a red direction traffic signal through the panel 17 indicating that the driver of the vehicle 1 is to turn to the right.

This is a simple compact device in the manipulation of which the driver may, with great safety, indicate to following drivers the direction the car is to be driven as well as disclosing the tail lamp and license signals in connection with a rear way disclosing lamp which might be considered a stationary spot light or rear lamp corresponding to a head-

What is claimed and it is desired to secure by United States Letters Patent is:

A traffic signal embodying a housing, a tail light, a way disclosing light above said tail light, compartments in said housing for said lights, said compartments having a partition separating said lights, a pair of directing lights, and a compartment for each directing light, each directing light compartment having a partition between it and the tail light, and between it and the way disclosing light.

In witness whereof I affix my signature.

HERMAN R. SAXON